(12) United States Patent
Kim et al.

(10) Patent No.: US 7,643,507 B2
(45) Date of Patent: Jan. 5, 2010

(54) MULTICAST PACKET PROCESSING APPARATUS AND METHOD

(75) Inventors: Bong-Cheol Kim, Suwon-si (KR); Byung-Chang Kang, Yongin-si (KR); Yong-Seok Park, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 653 days.

(21) Appl. No.: 11/329,111

(22) Filed: Jan. 11, 2006

(65) Prior Publication Data

US 2006/0171407 A1  Aug. 3, 2006

(30) Foreign Application Priority Data

Jan. 31, 2005  (KR) .................... 10-2005-0008783

(51) Int. Cl.
*H04J 3/26* (2006.01)
(52) U.S. Cl. ..................................... 370/432; 370/390
(58) Field of Classification Search ................ 370/312, 370/390, 432
See application file for complete search history.

(56) References Cited

U.S. PATENT DOCUMENTS

| 5,268,900 | A | * | 12/1993 | Hluchyj et al. | .............. 370/429 |
| 5,402,415 | A | * | 3/1995 | Turner | ........................ 370/390 |
| 5,477,541 | A | * | 12/1995 | White et al. | ................. 370/392 |
| 5,633,865 | A | * | 5/1997 | Short | ......................... 370/412 |
| 5,636,210 | A | * | 6/1997 | Agrawal | ..................... 370/390 |
| 6,775,280 | B1 | * | 8/2004 | Ma et al. | .................... 370/392 |
| 6,788,681 | B1 | * | 9/2004 | Hurren et al. | ............... 370/389 |
| 2002/0018469 | A1 | * | 2/2002 | Davis | ........................ 370/390 |
| 2002/0026482 | A1 | * | 2/2002 | Morishige et al. | .......... 709/206 |
| 2003/0081624 | A1 | * | 5/2003 | Aggarwal et al. | ........... 370/412 |

(Continued)

FOREIGN PATENT DOCUMENTS

JP  63-215131  9/1988

(Continued)

OTHER PUBLICATIONS

The Office Action from the Japanese Patent Office issued in Applicant's corresponging Japanese Patent Application No. 2006-018985 dated May 27, 2008.

*Primary Examiner*—Kwang B Yao
*Assistant Examiner*—Andrew Lai
(74) *Attorney, Agent, or Firm*—Robert E. Bushnell, Esq.

(57) ABSTRACT

A multicast packet forwarding apparatus and method that can combine an internal processor of a multicast packet processor into a forwarding unit and a packet duplicator in order to minimize delay in the processing time of a forwarder and a packet transmitter. In the apparatus, a packet receiver is adapted to receive unicast and multicast packets. A forwarding unit has a unicast forwarder for forwarding a unicast packet to a destination when the packet receiver receives the unicast packet, and a multicast forwarder for multicasting a multicast packet to respective output interfaces when the packet receiver receives the multicast packet. A packet duplicator is adapted to convert the multicast packet output from the multicast forwarder into a several unicast packets. A packet dispatcher is adapted to reintroduce the unicast packets converted by the packet duplicator to the forwarding unit again. A scheduler serves to port-schedule packets output via the forwarding unit and duplicated packets according to a scheduling policy.

35 Claims, 3 Drawing Sheets

U.S. PATENT DOCUMENTS

2004/0006641 A1 * 1/2004 Abrol et al. .................. 709/245

FOREIGN PATENT DOCUMENTS

| JP | 02-034060 | 2/1990 |
| JP | 03-186036 | 8/1991 |
| JP | 05-199257 | 8/1993 |
| JP | 07-143137 | 6/1995 |
| JP | 08-331132 | 12/1996 |
| JP | 2000-503194 | 3/2000 |
| JP | 2000-115178 | 4/2000 |
| JP | 2000-183908 | 6/2000 |
| JP | 2000-349774 | 12/2000 |
| JP | 2002-077168 | 3/2002 |
| JP | 2002-111716 | 4/2002 |

* cited by examiner

MULTICAST PACKET PROCESSING APPARATUS AND METHOD

CLAIM OF PRIORITY

This application makes reference to and claims all benefits accruing under 35 U.S.C. §119 from an application for MULTICAST PACKET PROCESSING APPARATUS AND METHOD earlier filed in the Korean Intellectual Property Office on 31 Jan. 2005 and there duly assigned Serial No. 2005-8783.

BACKGROUND OF THE INVENTION

1. Field of the Invention

The present invention relates to a multicast packet processing apparatus and a method of processing where both multicast packet forwarding and packet duplication can be achieved by the same forwarding apparatus leading to a simplified process as well as an enhanced processing rate.

2. Description of the Related Art

Internet transmission involves transmitters and receivers, each of which can be classified into unicast, multicast and broadcast transmission devices. Unicast transmission involves a single transmitter that transmits data to a single receiver. Unicast transmission has been adopted by all common Internet application programs. Broadcast transmission involves a single transmitter that transmits data to all receivers in the same sub-network. Multicast transmission is where one transmitter transmits data to at least one receiver. Multicast transmission is often used for Internet video conferencing.

When a transmitter attempts to transmit the same data to a plurality of receivers for group-communication according to unicast transmission, the transmitter must repeatedly transmit the same data packet subject to each of a plurality of receivers. Such repeated transmission of the same packet deteriorates network efficiency. The seriousness of the problem of deteriorated network efficiency is in proportion to the number of receivers. When multicast transmission is supported, a transmitter has to duplicate data to ensure that the same message is transmitted to several receivers at one time. Such multicopy transmission of data tends to waste network resources.

Router equipment is classified into data plane, control plane and management plane based on their function. Each function is installed and operated in a network processor and in a host processor. When data plane operates in the network processor, a packet is forwarded to the host processor, requiring more complicated processing than either a packet forwarding function or a simple forwarding function. When either control plane or management plane operates in the host processor, a routing table is constructed via routing protocol message processing with management by an operator.

Regarding earlier techniques of multicast packet processing in a network processor, all Output InterFace (OIF) lists generally share new packet descriptors that are as numerous as the number of OIF lists. The packet descriptors are obtained by looking up information of a multicast forwarding table by using the source address and the group address of a received multicast packet, and a packet buffer corresponding thereto. As a result, processing is very complicated, especially when there are exceptional changes to the payload of the packet. Also, additional processing is needed during tunneling when a packet transmitter encapsulates/decapsulates IPv4 header information. This additional processing, in addition to being complicated, also affects the performance of the packet transmitter. Therefore, when processing an exceptional situation, such as when quality of service (QoS) and tunneling are carried out, other functions in the process pipeline may be affected, leading to many problems in general forwarding performance. Therefore, what is needed is an improved design of a forwarding unit in a router that can handle all of the above functions without being too complicated and without sacrificing general forwarding performance.

SUMMARY OF THE INVENTION

It is therefore an object of the present invention to provide an improved multicast packet forwarding apparatus.

It is also an object of the present invention to provide an improved multicast packet processing method.

It is still an object of the present invention to provide a packet forwarding apparatus that can forward both multicast packets as well as duplicate packets.

It is further an object of the present invention to provide a forwarding apparatus that can provide for tunneling.

It is yet an object an object of the present invention to provide a forwarding apparatus for QoS.

It is still an object of the present invention to provide multicast packet forwarding apparatus and method that can serve as both a forwarding unit and as a packet duplicator in an internal processor of a multicast packet processor in order to minimize delay in the processing time of a forwarder and of a packet transmitter.

These and other objects can be achieved by a multicast packet processing apparatus in a router, the apparatus including a packet receiver adapted to receive both unicast and multicast packets, a forwarding unit that includes a unicast forwarder and a multicast forwarder, the unicast forwarder being adapted to forward a unicast packet to a destination upon receipt of the unicast packet by the packet receiver, the multicast forwarder being adapted to multicast a multicast packet to respective output interfaces upon receipt of the multicast packet by the packet receiver, a packet duplicator adapted to convert the multicast packet output from the multicast forwarder into a plurality of unicast packets, a packet dispatcher adapted to reintroduce the plurality of unicast packets converted by the packet duplicator back into the forwarding unit, and a scheduler adapted to port-schedule packets output from the forwarding unit and packets output from the packet duplicator according to a scheduling policy.

According to another aspect of the present inventions is a multicast packet processing method of a router, the method including providing a router, determining whether or not a received packet is a unicast packet or a multicast packet, transmitting the received packet to a corresponding destination when the received packet is determined to be a unicast packet, converting the received packet into a plurality of unicast packets when the received packet is determined to be a multicast packet, and reintroducing the plurality of unicast packets produced during the converting back into the router when the received packet is a multicast packet.

According to yet another aspect of the present invention, there is provided a multicast packet processing method in a router, the method including providing a router, determining whether or not a received packet is a unicast packet or a multicast packet, transmitting the received packet to a corresponding destination when the received packet is determined to be a unicast packet, converting the received packet into a plurality of unicast packets when the received packet is determined to be a multicast packet, reintroducing the plurality of unicast packets produced during the converting back into the router when the received packet is a multicast packet The present invention pertains to a technology that duplicates a multicast packet and forwards the duplicated packets to their destinations. In describing the present invention, emphasis will be made on the network processor where the packet duplication is carried out.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
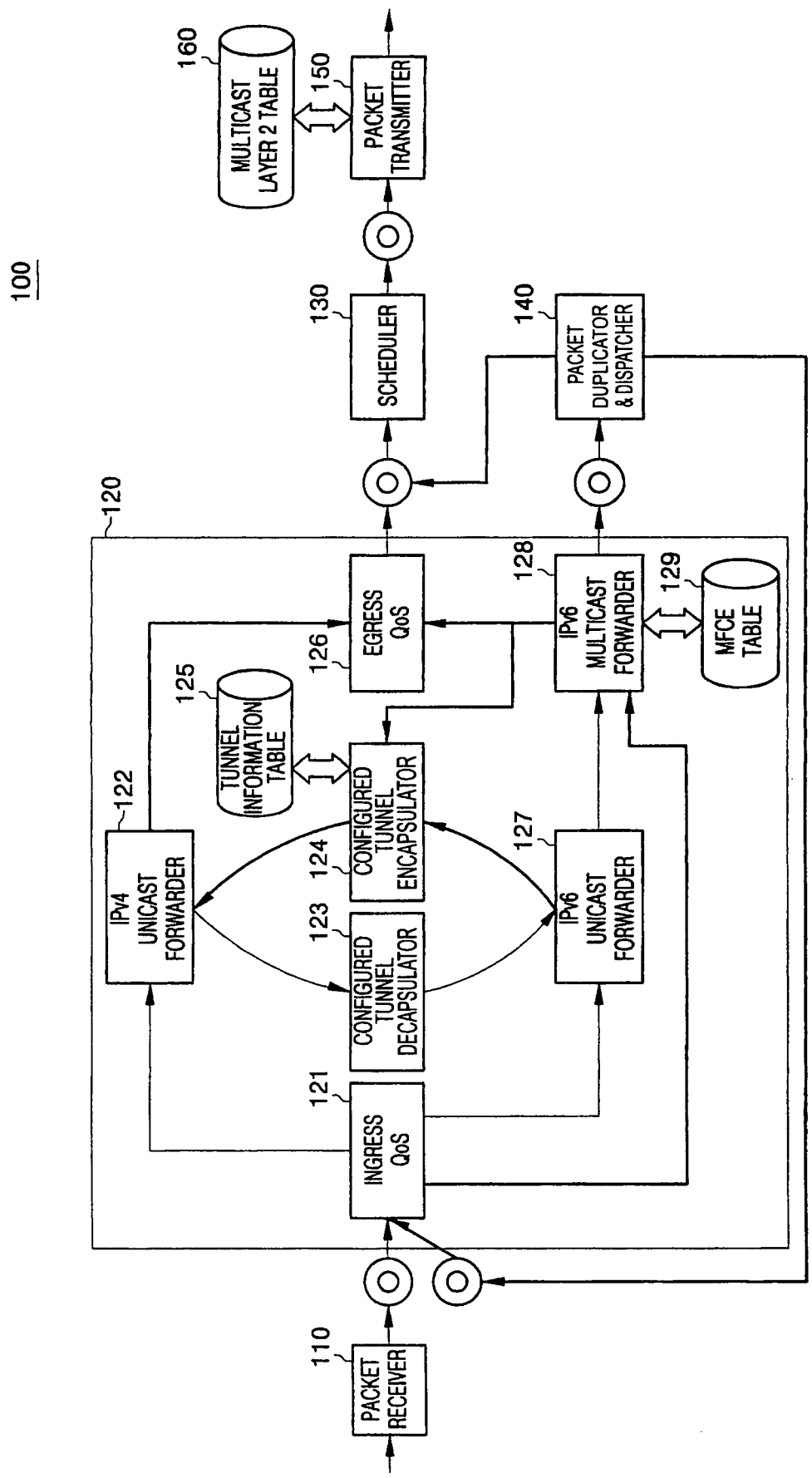
FIG. 1 is a view of a block diagram illustrating a multicast packet forwarding apparatus according to a first embodiment of the invention.

Turning now to the figures, FIG. 1 is a view of a block diagram illustrating a multicast packet forwarding apparatus 100 for forwarding IPv6 multicast packets according to a first embodiment of the present invention. In FIG. 1, the reference symbol '⊚' stands for a queue. The queue '⊚' will not be further described in the specification since it operates in a common fashion.

As illustrated in FIG. 1, the network forwarding apparatus 100 includes a packet receiver 110, a packet forwarding unit 120, a scheduler 130, a packet duplicator and dispatcher 140 and a packet transmitter 150. The packet forwarding unit 120 is adapted to transmit received packets to a unicast forwarder or a multicast forwarder according to the received packet type. The scheduler 130 is adapted to perform port-scheduling in queues '⊚' and to perform de-queuing of the packets. Queues '⊚' are provided in output ports for storing packets output via the forwarding unit 120 according to a scheduling policy. The packet duplicator and dispatcher 140 is adapted to duplicate output packets from the multicast forwarder of the forwarding unit 120 and to distribute and transmit the duplicated packets back again into the queues of the forwarding unit 120 that are adapted to receive these recycled packets. The packet transmitter 150 is adapted to acquire routing information with reference to a multicast layer 2 table 160, and to transmit packets to acquired destination addresses.

The forwarding unit 120 can receive the packets from the packet receiver 110 as well as the packet duplicator and dispatcher 140 via the respective queues. The respective queues perform de-queuing generally in a round robin fashion. According to the existence of enqueued packets managed in each queue, an occurrence of an empty queue causes the empty queue to be skipped and a packet is then de-queued from another queue that is not empty instead.

The forwarding unit 120 serves to receive input packets from both the packet receiver 110 and the packet duplicator and dispatcher 140. According to a setting of a QoS Enable/Disable flag of a packet, the forwarding unit 120 performs Ingress QoS operations at Ingress QoS 121 or bypasses Ingress QoS 121. Also, depending on whether a received IPv6 packet is unicast or multicast, the forwarding unit 120 forwards a packet to IPv6 unicast forwarder 127 or to IPv6 multicast forwarder 128. If instead the received packet is an IPv4 unicast packet, forwarding unit 120 forwards the received packet to IPv4 unicast forwarder 122.

In an IPv6-IPv4-IPv6 type network, a tunneling process must be present to support communication between two IPv6 terminal equipments via the IPv4 network. A configured tunneling function is provided in order to configure tunneling parameters by an operator for the purpose of establishing a tunnel with respect to individual networks. It is required, at a starting point of the configured tunnel, to perform encapsulation at tunnel encapsulator 124 by attaching an IPv4 header to an IPv6 packet by referring to a tunnel information table 125. It is also required, at an end point of the configured tunnel, to perform decapsulation at tunnel decapsulator 123 by removing the IPv4 header from the IPv6 packet after having passed through the tunnel so that the IPv6 packet is recovered.

When an input packet is an IPv6 unicast packet, the IPv6 unicast forwarder 127 consults a lookup table (not illustrated) to determine whether or not the input packet is being tunneled. If the input packet is being tunneled, the IPv6 unicast forwarder 127 forwards the input packet to tunnel encapsulator 124 so that an IPv4 header can be attached to the input packet.

When a received multicast packet is to be tunneled and when a portion of a multicast Output Interface (OIF) of a Multicast Forwarding Cache Entry (MFCE) table 129 is set as a configured tunnel, the IPv6 multicast forwarder 128 forwards the packet corresponding to an OIF entry set as the configured tunnel to configured tunnel encapsulator 124 in order to perform IPv4 header encapsulation. In the meantime, before a packet can be forwarded to the scheduler 130 upon completion of packet processing, egress processing is performed by Egress QoS 126 when QoS flag of the packet is enabled. When the QoS flag is disabled, Egress QoS 126 is bypassed.

Now the operation of the present invention will be described. Ingress QoS 121 performs ingress QoS processing on an original multicast packet received from the packet receiver 110 depending on whether QoS flag for the packet is enabled or disabled (i.e., whether or not a receiving port supports QoS). In order to support IPv6 multicast QoS, data such as source address and group address are to be registered according to QoS level regulations. Then, the packet is to bypass the IPv6 unicast forwarder 127 in order to prevent repeated validation of the IP header and to process a Protocol Independent Multicast (PIM) register packet.

In general, the PIM register packet is a message, which is encapsulated and sent to a rendezvous point. When the packet is a PIM register packet, a PIM type is marked 1, and the original multicast packet is forwarded to the rendezvous point to a data area that follows a PIM header.

According to this invention, since the PIM register packet is a unicast packet, the IPv6 unicast forwarder first determines whether or not the packet is a register packet. Then, since the packet is related to multicasting, the packet is forwarded to the IPv6 multicast forwarder 128 so that subsequent processing can be performed. Accordingly, if the packet is determined to be a PIM register packet or an IPv6 multicast packet, the IPv6 unicast forwarder 127 forwards the packet to the IPv6 multicast forwarder 128. The multicast forwarder 128 then performs following functions:

Decapsulation for PIM register packets

Multicast Forwarding Cache Entry (MFCE) table 129 Lookup according to Source Address & Group Address; and RPF (Reverse Path Forwarding) Validation according to Incoming Interface data stored in an MFCE After the above process is normally performed, OIF and Exception are inspected to determine whether or not packet duplication is necessary. Only when packet duplication is necessary (i.e., when the sum of Exception and OIF is 2 or more), an OIF list is forwarded to the packet duplicator and dispatcher 140.

Packet duplication is performed only if the sum of Exception and OIF is 2 or more because of following reasons. When a router acts as a source-dedicated router, there are frequent situations where a PIM register packet is encapsulated and multicast-forwarded at the same time. In this scenario, since PIM register encapsulation is performed by a higher application, the PIM register packet is treated as an Exception packet and forwarded to a higher layer. Then, general forwarding is performed with respect to remaining OIF areas.

If packet duplication is not necessary (i.e., the sum of Exception and OIF is 1), packet data is forwarded to tunneling encapsulator 124 for tunneling or to Egress QoS 128 and processed if the QoS Enable/Disable flag on the packet is set to enable and then to an output port type passing through the packet duplicator and dispatcher 140 so that next process can be performed.

When a packet is sent to packet duplicator and dispatcher 140, the multicast packet duplicator and dispatcher 140 generates new Child Packet Descriptors corresponding to the number of OIFs according to OIF list data received from the IPv6 multicast forwarder 128, and duplicates some data such as packet size and offset from a Parent Packet Descriptor containing original multicast data, which is received from the packet receiver 110.

Reference count is kept in the Parent Packet Descriptor to manage the number of the child packet descriptors, which are initially set corresponding to the OIF number by the packet duplicator and dispatcher 140. The Parent Packet Descriptor stores data such as storage position of a received original multicast packet, its size information and the total number of duplicated packets in a Reference Count field.

Each of the Child Packet Descriptors store output port information corresponding to each output port in the OIF list and next process information determined by QoS Enable/Disable flag and interface type. That is, in case of a general OIF, index information of a multicast layer 2 table 160 is stored. If OIF is set as a tunnel, indices of a tunnel information table 125 are stored, in which IPv4 header information to be encapsulated is stored in the tunnel information table 125. An additional flag is established to identify a duplicated multicast packet so that the next process can be performed efficiently.

Whenever a packet is duplicated, each Child Packet Descriptor duplicates and stores storage position and size information of the original multicast packet from the Parent Packet Descriptor along with a pointer pointing to the Parent Packet Descriptor and so on. Whenever the duplicated packet is transmitted, the Child Packet Descriptors are set free, and the Reference Counter of the Parent Packet Descriptor is reduced by 1. When the Reference Counter of the Parent Packet Descriptor becomes 0 (i.e., all of duplicated packets are transmitted), the Parent Packet Descriptor is also set free and thus can be used again.

In the meantime, the packet duplicator and dispatcher 140 duplicates only packet information in a Parent Packet Descriptor whenever generating a Child Packet Descriptor, but does not duplicate the payload stored in a parent packet buffer. Instead, the Child Packet Descriptor can maintain a pointer pointing to the Parent Descriptor allowing for access to the packet information and the payload stored in the parent packet buffer. Also the Child Packet Descriptor itself has a one-to-one matching child packet buffer where an IPv4 header for encapsulation is stored in case of tunneling. This is to remove any change in parent packet buffer information shared by a plurality of OIFs.

In addition, the packet duplicator and dispatcher 140 determines whether a duplicated multicast packet will be reintroduced back into forwarding unit 120 or be directly transmitted according to QoS Enable/Disable flag and interface types corresponding to the individual OIFs. Only when the QoS flag is set to enable or when interface types are of a configured tunnel are they reintroduced into the forwarding unit 120 so that tunnel encapsulation can then take place or so egress QoS processing can then take place.

Since additional processing at the forwarding unit 120 is unnecessary when the QoS flag of the packet is Disabled and when the packet has a common interface type, such a packet is then forwarded to the scheduler 130, and then the packet is forwarded to the packet transmitter 150 according to an order of scheduling.

In particular, in order to minimize delay deviation and ensure a packet distribution procedure, the packet duplicator and dispatcher 140 generates new descriptors while constantly maintaining OIF list orders on an MFCE table 129, and then reintroduces the descriptors back into the forwarding unit 120.

When a multicast packet is re-injected and unicasted at the packet duplicator and dispatcher 140, packet descriptor type marked by the packet duplicator and dispatcher 140 is inspected. Then, the multicast packet is forwarded to the IPv6 multicast forwarder 128 without being processed at Ingress QoS 121. The IPv6 multicast forwarder 128 recognizes that the received packet is a duplication recycled by the packet duplicator and dispatcher 140, and then prepares the packet for subsequent QoS Egress processing.

If an output port is a configured tunnel interface, the packet is forwarded to the configured tunnel encapsulator 124. Upon receiving the packet, the configured tunnel encapsulator 124 performs IPv4 Encapsulation by using tunnel table ID 1 stored in the Child Descriptor by the packet duplicator and dispatcher 140, without having to perform any lookup process. Then, according to whether Egress QoS flag is Enabled or Disabled, the packet is forwarded to the packet transmitter 150 via Egress QoS 126 and via scheduler 130 like a unicast packet.

If the output port is not a configured tunnel, the IPv6 multicast forwarder 128 determines QoS Enable or Disable, and the packet is forwarded to the packet transmitter 150 via Egress QoS 126 like the unicast packet.

Upon having transmitted the duplicated multicast packet, the packet transmitter 150 sets the Child Packet Descriptor free so that it can be reused, resulting in the reference count stored in the Parent Packet Descriptor being decremented by one. When the reference counter of the Parent Packet Descriptor becomes 0 (i.e., when, there are no Child Packet Descriptors remaining), the Parent Packet Descriptor is also set free.

Figure 2:
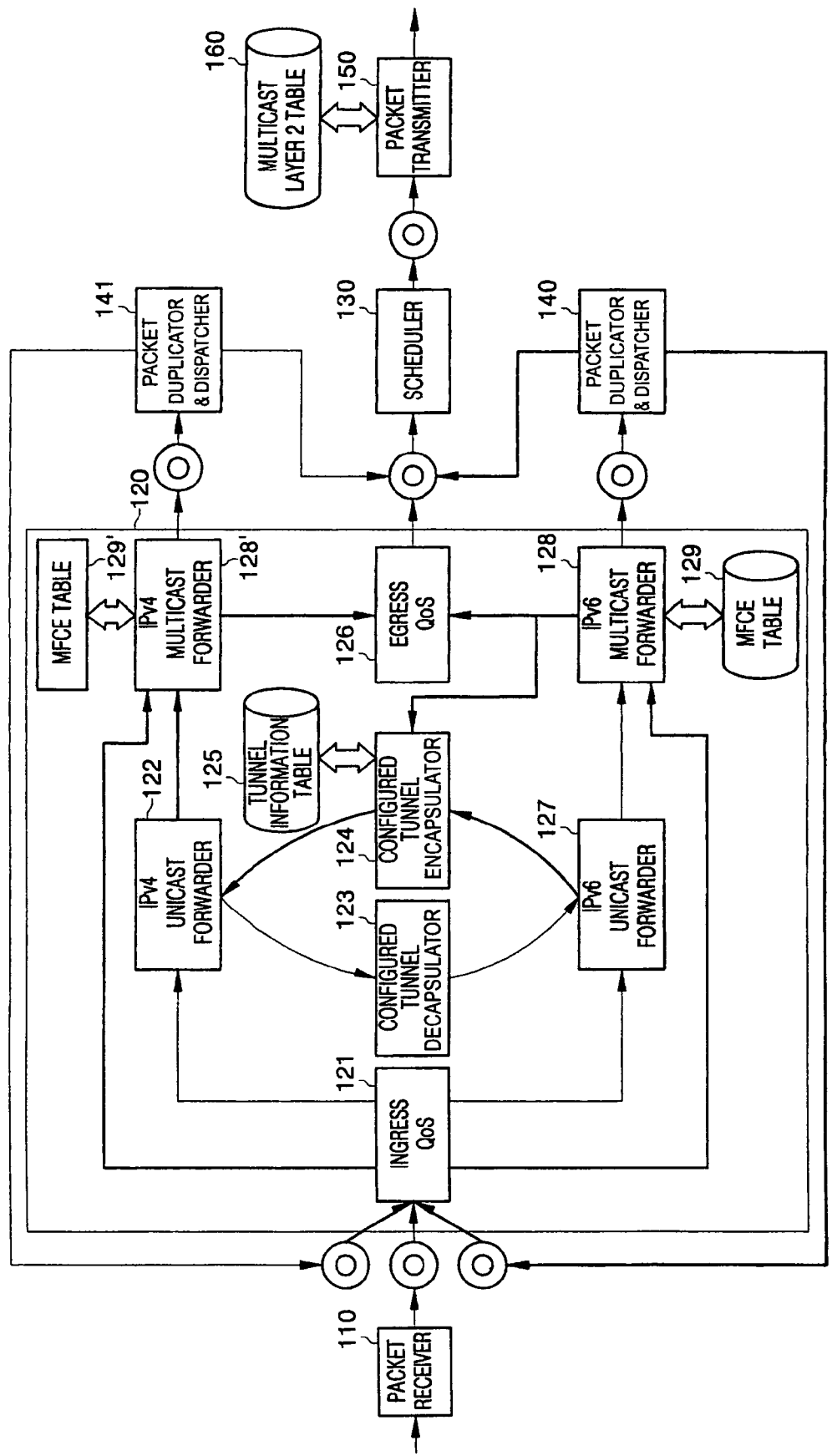
FIG. 2 is a view of a block diagram illustrating a multicast packet forwarding apparatus according to a second embodiment of the invention.

Turning now to FIG. 2, FIG. 2 is a view of a block diagram illustrating a multicast packet forwarding apparatus 200 according to a second embodiment of the invention. The multicast packet forwarding apparatus 200 illustrated in FIG. 2 is substantially the same as the multicast packet forwarding apparatus 100 of FIG. 1 except that an IPv4 packet is forwarded to an IPv4 multicast forwarder 128' with the possibility that MFCE table 129' is accessed. Therefore, the apparatus 200 in FIG. 2 will not be further described.

Figure 3:
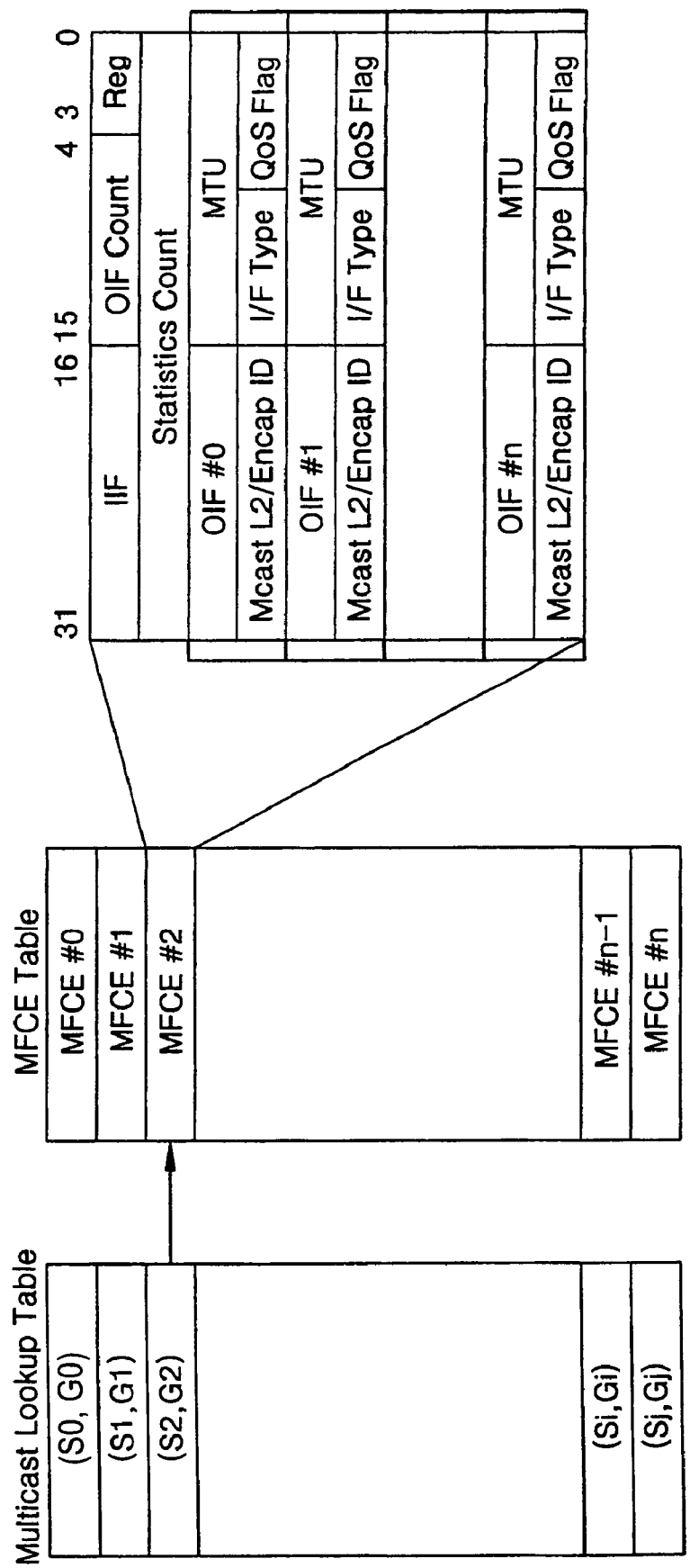
FIG. 3 is a view of a multicast packet lookup table in use for the realization of the present invention.

Turning now to FIG. 3, FIG. 3 is a view of a multicast packet lookup table in use for the realization of the present invention. Referring to FIG. 3, in initial establishment of MFCE and MTU information of each output port, interface type information (e.g., configured tunnel or normal interface), Enable/Disable information of Egress QoS and L2 (Layer 2) header information to be encapsulated are previously constructed, and then L2 table ID for multicast is stored in order to reduce overhead that accesses additional data structures for multicast packet processing.

Even when a corresponding output port is of a configured tunnel, the present invention acquires previously-configured tunneling information in advance and stores tunnel table ID storing IP header information subject to encapsulation in MFCE, so that IPv4 header encapsulation can be performed rapidly by a configured tunnel encapsulator without having to pass through an additional lookup in the event of later encapsulation to a duplicated multicast packet reintroduced from the packet duplicator.

In addition, IPv6 multicast QoS function can be supported for a multicast packet, which is duplicated by the packet duplicator and thus already converted into unicast packets, without particularly modifying previous unicast QoS. That is, merely adding packet classification entry for IPv6 multicast packet enables multicast QoS support.

According to the present invention as described hereinbefore, the packet multicast transmission function, which has been performed by a conventional packet transmitter in case of multicast processing, is distributed to the multicast forwarder and the multicast packet duplicator in order to remove processing pipeline break or blocking of the forwarding unit or the packet transmitter owing to exceptional processing of the multicast packet as well as to minimize delay and jitter, thus enhancing multicast forwarding performance. Furthermore, this invention enables a multicast packet to be duplicated as many times as the output OIFs and converted into unicast packets before entering the forwarding unit while the order of an OIF list is maintained, thus more effectively supporting multicast QoS or configured tunnel of each output port.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus, comprising:
a packet receiver adapted to receive both unicast and multicast packets;
a forwarding unit that includes a unicast forwarder and a multicast forwarder, the unicast forwarder being adapted to forward a unicast packet to a destination upon receipt of the unicast packet by the packet receiver, the multicast forwarder being adapted to multicast a multicast packet to respective output interfaces upon receipt of the multicast packet by the packet receiver;
a packet duplicator adapted to convert the multicast packet output from the multicast forwarder into a plurality of unicast packets;
a packet dispatcher adapted to determine whether the plurality of unicast packets converted by the packet duplicator are to be reintroduced back into the forwarding unit or be directly transmitted, the packet dispatcher being further adapted to reintroduce the plurality of unicast packets converted by the packet duplicator back into the forwarding unit or directly transmit them based on said determination; and
a scheduler adapted to port-schedule packets output from the forwarding unit and packets directly transmitted from the packet duplicator according to a scheduling policy.

2. The apparatus of claim 1, wherein the forwarding unit is adapted to receive the packets introduced from the packet receiver and packets reintroduced from the packet duplicator via two respective queues and to de-queue between the two queues in a round-robin fashion.

3. The apparatus of claim 2, wherein the apparatus is adapted, according to an existence of an enqueued packet managed in each queue, to skip a round of an empty queue and to instead de-queue a packet from a non-empty queue.

4. The apparatus of claim 1, wherein the forwarding unit is adapted to determine whether or not to support Quality of Service (QoS) of an original multimedia packet received from the packet receiver or perform an Ingress QoS function according to a setting of a QoS enable/disable flag in the packet.

5. The apparatus of claim 1, wherein the forwarding unit is adapted to support a configured tunnel encapsulation function for a packet that needs IPv4 header encapsulation that allows the packet to pass through an IPv4 network.

6. The apparatus of claim 5, wherein the forwarding unit is adapted to perform encapsulation by attaching an IPv4 header to an IPv6 packet with reference to a tunnel information table at a beginning of a configured tunnel.

7. The apparatus of claim 5, wherein the apparatus is adapted to, when a packet passes through a tunnel, perform decapsulation by removing an IPv4 header from the packet so that the packet recovers as an IPv6 packet.

8. The apparatus of claim 7, wherein the unicast forwarder is an IPv6 unicast forwarder, the forwarding unit is adapted to, when an input packet is an IPv6 unicast packet, determine whether or not the tunnel is a configured tunnel with reference to a lookup table in the IPv6 unicast forwarder, and when the tunnel is a configured tunnel, to perform IPv4 header encapsulation by a configured tunnel encapsulator.

9. The apparatus of claim 7, wherein the multicast forwarder is an IPv6 multicast forwarder, the IPv6 multicast forwarder being adapted to forward a packet corresponding to an Output InterFace (OIF) entry that is set as a configured tunnel to a configured tunnel encapsulator that is adapted to perform IPv4 header encapsulation when an input packet is a multicast packet and a multicast output interface of a Multicast Forwarding Cache Entry (MFCE) is partially set as the configured tunnel.

10. The apparatus of claim 1, wherein the packet duplicator is adapted to determine a number of times a packet is to be duplicated according to OIF list information output from the forwarding unit.

11. The apparatus of claim 10, wherein the packet duplicator is adapted to forward packet information to a tunnel processor or an Egress QoS based on a setting of a QoS Enable/Disable flag and based on an output port type without passing through the packet duplicator when packet duplication is unnecessary because the sum of an exception packet and an OIF is 1.

12. The apparatus of claim 11, wherein the packet duplicator is adapted to generate a plurality of new child packet descriptors and to duplicate packet information including packet size and offset from a parent packet descriptor that comprises information of an original multicast packet received from the packet receiver, the plurality of new child packets generated being equal to a number of output interfaces according to OIF list information received from the forwarding unit.

13. The apparatus of claim 12, wherein the packet duplicator is adapted to maintain a reference count in the parent packet descriptor in order to manage a number of the duplicated child packet descriptors, wherein the reference count is initially set to as many as the number of the output interfaces by the packet duplicator.

14. The apparatus of claim 13, wherein the packet duplicator is adapted to store output port information corresponding each output port in the OIF list, the QoS enable/disable flag and process flow information determined by interface type in the child packet descriptors.

15. The apparatus of claim 1, wherein the packet duplicator is adapted to duplicate packet information only in a parent packet descriptor whenever generating a child packet descriptor without duplicating payload itself arranged in an actual packet buffer.

16. The apparatus of claim 15, wherein the packet duplicator is adapted to determine whether to reintroduce a duplicated multicast packet to the forwarding unit or to directly transmit the duplicated multicast packet through a packet transmitter based on a setting of a QoS enable/disable flag corresponding to each output interface and interface type.

17. The apparatus of claim 16, wherein the packet duplicator is adapted to reintroduce the multicast packet to the forwarding unit to encapsulate tunnel information or to enable an Egress QoS function when the QoS enable/disable flag is set to enable or when an interface type is a configured tunnel.

18. The apparatus of claim 16, wherein the packet duplicator is adapted to directly forward the multicast packet to the packet transmitter when the QoS enable/disable flag is set to disable and when there is a common interface.

19. A method, comprising:
providing a forwarding apparatus that includes a forwarding unit having an input and an output;
receiving a packet via said input of said forwarding unit;
determining whether or not the received packet is a unicast packet or a multicast packet;
transmitting the received packet to a corresponding destination when the received packet is determined to be a unicast packet;
converting the received packet into a plurality of unicast packets when the received packet is determined to be a multicast packet; and
re-injecting the plurality of unicast packets produced during the converting back into the input of the forwarding unit when the received packet is a multicast packet and when an additional condition is met.

20. A method, comprising:
providing a forwarding apparatus that includes a forwarding unit having an input and an output;
receiving a packet via said input of said forwarding unit;
determining whether or not the received packet is a unicast packet or a multicast packet;
converting the received packet into a plurality of unicast packets when the received packet is determined to be a multicast packet; and
re-injecting the multicast packet as the plurality of unicast packets produced during the converting back into the input of the forwarding unit when the received packet is a multicast packet and when an additional condition is met.

21. The method of claim 20, further comprising transmitting the received packet to a corresponding destination when the received packet is determined to be a unicast packet.

22. The method of claim 20, further comprising:
storing a desired original packet descriptor address in a new packet descriptor register;
storing an output interface list number in an original packet descriptor; and
determining whether tunnel encapsulation or egress QoS processing will occur based on an output port interface type and based on a setting of a Quality of Service (QoS) enable/disable flag.

23. The method of claim 20, the additional condition being one of the QoS flag being set to enable and tunneling being necessary.

24. The method of claim 23, further comprising performing IPv4 header encapsulation in preparation for passage through an IPv4 network when tunneling is necessary.

25. The method of claim 20, further comprising conducting Egress QoS processing for a re-injected multicast packet that is received from a packed duplicator through a multicast forwarder according to packet descriptor type without conducting additional Ingress processing.

26. The method of claim 20, further comprising forwarding the re-injected multicast packet to a tunnel encapsulator and storing the re-injected multicast packet in a packet buffer corresponding to a packet descriptor of a duplication by using a tunnel table identifier stored in the packet descriptor without passing through particular lookup so as to delete a change in an original packet payload portion shared between OIF lists when an output port is a configured tunnel at a multicast forwarder upon receiving the re-injected multicast packet.

27. The method of claim 26, further comprising forwarding the re-injected multicast packet to an Egress QoS processor when a QoS of an output port is set to enable and at a multicast forwarder upon receiving the re-injected multicast packet.

28. The method of claim 20, further comprising:
re-assembling multicast layer 2 header information, tunnel header information stored in a duplicated packet buffer and a payload portion stored in an original packet buffer; and then
transmitting the packet when an output port of a packet transmitter is a configured tunnel.

29. The method of claim 20, further comprising:
decrementing a reference count by 1 upon a duplicated packet descriptor being set free; and
setting an original packet descriptor free when the reference count becomes 0 at a packet transmitter.

30. The method of claim 20, further comprising preparing multicast layer 2 information for encapsulation before a packet transmitter transmits the packet upon generation of a new Multicast Forwarding Cache Entry (MFCE).

31. The method of claim 20, further comprising storing Maximum Transmission Unit (MTU) according to output port, interface type, QoS enable/disable flag setting, multicast layer 2 table identifier and tunnel table identifier in advance to determine a next processing step without accessing a separate data structure.

32. The method of claim 31, further comprising performing encapsulation by attaching an IPv4 header to an IPv6 packet with reference to a tunnel information table at a beginning of a configured tunnel.

33. The method of claim 31, further comprising performing decapsulation by removing an IPv4 header from a packet that has passed through a configured tunnel recovering the packet to an IPv6 packet at an end of the configured tunnel.

34. The method of claim 31, further comprising:
determining whether or not a tunnel is a configured tunnel when an input packet is an IPv6 unicast packet and when the input packet is at an IPv6 unicast forwarder; and performing configured tunnel encapsulation when a tunnel is a configured tunnel.

35. The method of claim 20, wherein said receiving a packet via said input of said forwarding unit comprises:
providing a first queue that receives packets from outside said forwarding apparatus and a second queue that receives packets from within said forwarding apparatus for reintroduction back into said forwarding unit;
de-queuing a packet from one of said first queue and said second queue in a round-robin fashion; and
inputting said de-queued packet into said input of said forwarding unit.

* * * * *

UNITED STATES PATENT AND TRADEMARK OFFICE
CERTIFICATE OF CORRECTION

PATENT NO. : 7,643,507 B2  Page 1 of 1
APPLICATION NO. : 11/329111
DATED : January 5, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1001 days.

Signed and Sealed this

Twenty-first Day of December, 2010

David J. Kappos
*Director of the United States Patent and Trademark Office*